(12) United States Patent
Langendijk

(10) Patent No.: US 8,228,275 B2
(45) Date of Patent: Jul. 24, 2012

(54) OPTIMAL SUBPIXEL ARRANGEMENT FOR DISPLAYS WITH MORE THAN THREE PRIMARY COLORS

(75) Inventor: Erno Hermanus Antonius Langendijk, Eindhoven (NL)

(73) Assignee: Genoa Color Technologies Ltd., Herzlia (IL)

( * ) Notice: Subject to any disclaimer, the term of this patent is extended or adjusted under 35 U.S.C. 154(b) by 1431 days.

(21) Appl. No.: 10/543,511

(22) PCT Filed: Jan. 13, 2004

(86) PCT No.: PCT/IB2004/050016
§ 371 (c)(1),
(2), (4) Date: Jul. 26, 2005

(87) PCT Pub. No.: WO2004/068460
PCT Pub. Date: Aug. 12, 2004

(65) Prior Publication Data
US 2006/0098033 A1    May 11, 2006

(30) Foreign Application Priority Data

Jan. 28, 2003 (EP) .................................... 03100164

(51) Int. Cl.
*G09G 3/36* (2006.01)
*G09G 5/02* (2006.01)
(52) U.S. Cl. ............................ 345/88; 345/603; 345/604
(58) Field of Classification Search .................... 345/88, 345/603, 604; 349/79, 86, 165
See application file for complete search history.

(56) References Cited

U.S. PATENT DOCUMENTS

| | | |
|---|---|---|
| 3,699,244 A | 10/1972 | Cohen et al. |
| 3,870,517 A | 3/1975 | Ota et al. |
| 4,390,893 A | 6/1983 | Russell et al. |
| 4,751,535 A | 6/1988 | Myers |
| 4,800,375 A | 1/1989 | Silverstein et al. |
| 4,843,381 A | 6/1989 | Baron |
| 4,843,573 A | 6/1989 | Taylor et al. |
| 4,892,391 A | 1/1990 | Stewart et al. |
| 4,952,972 A | 8/1990 | Someya |
| 4,953,953 A * | 9/1990 | Fergason .................... 349/79 |
| 4,985,853 A | 1/1991 | Taylor et al. |
| 4,994,901 A | 2/1991 | Parulski et al. |

(Continued)

FOREIGN PATENT DOCUMENTS

EP    0367848    5/1990

(Continued)

OTHER PUBLICATIONS

U.S. Appl. No. 09/710,895, dated Nov. 14, 2000, Ben David et al.

(Continued)

*Primary Examiner* — Kevin M Nguyen
(74) *Attorney, Agent, or Firm* — Pearl Cohen Zedek Latzer, LLP

(57) ABSTRACT

A display comprising a plurality sub-pixel display elements respectively displaying different colors, arranged into a plurality of single-row pixels, wherein for adjacent pixels, each sub-pixel display element associated with the first pixel bears a minimal spatial distance to a respective sub-pixel display element associated with the second pixel that represents a color having a maximum color distance with respect to the color represented by such sub-pixel display element, as compared to the color distance between the color represented by the sub-pixel display element and other colors.

6 Claims, 8 Drawing Sheets

U.S. PATENT DOCUMENTS

| | | | |
|---|---|---|---|
| 5,042,921 A | 8/1991 | Sato et al. |
| 5,087,610 A | 2/1992 | Hed |
| 5,184,114 A | 2/1993 | Brown |
| 5,191,450 A | 3/1993 | Yajima et al. |
| 5,214,418 A | 5/1993 | Fukumura et al. |
| 5,233,183 A | 8/1993 | Field |
| 5,233,385 A | 8/1993 | Sampsell |
| 5,243,414 A | 9/1993 | Dalrymole et al. |
| 5,375,002 A | 12/1994 | Kim et al. |
| 5,416,890 A | 5/1995 | Beretta |
| 5,447,811 A | 9/1995 | Buhr et al. |
| 5,455,600 A | 10/1995 | Friedman et al. |
| 5,563,621 A | 10/1996 | Silsby |
| 5,592,188 A | 1/1997 | Doherty et al. |
| 5,614,925 A | 3/1997 | Braudaway et al. |
| 5,631,734 A | 5/1997 | Stern et al. |
| 5,642,176 A | 6/1997 | Abukawa et al. |
| 5,650,942 A | 7/1997 | Granger |
| 5,657,036 A | 8/1997 | Markandey et al. |
| 5,724,062 A | 3/1998 | Hunter |
| 5,736,754 A | 4/1998 | Shi et al. |
| 5,740,334 A | 4/1998 | Lin et al. |
| 5,751,385 A | 5/1998 | Heinze |
| 5,784,038 A | 7/1998 | Irwin |
| 5,821,913 A | 10/1998 | Mamiya |
| 5,835,099 A | 11/1998 | Marimont |
| 5,841,492 A | 11/1998 | Iwauchi et al. |
| 5,841,494 A | 11/1998 | Hall |
| 5,844,540 A | 12/1998 | Terasaki |
| 5,844,699 A | 12/1998 | Usaml et al. |
| 5,863,125 A | 1/1999 | Doany |
| 5,870,530 A | 2/1999 | Balasubramanian |
| 5,872,898 A | 2/1999 | Mahy |
| 5,892,891 A | 4/1999 | Dalal et al. |
| 5,909,227 A | 6/1999 | Silverbrook |
| 5,936,617 A | 8/1999 | Uchino et al. |
| 5,982,347 A | 11/1999 | Shigeta et al. |
| 5,982,541 A | 11/1999 | Li et al. |
| 5,999,153 A | 12/1999 | Lind et al. |
| 6,018,237 A | 1/2000 | Havel |
| 6,058,207 A | 5/2000 | Tuijn et al. |
| 6,069,601 A | 5/2000 | Lind et al. |
| 6,072,464 A | 6/2000 | Ozekl |
| 6,097,367 A | 8/2000 | Kuriwaki et al. |
| 6,100,861 A | 8/2000 | Cohen et al. |
| 6,144,420 A | 11/2000 | Jung |
| 6,147,720 A | 11/2000 | Guerinol et al. |
| 255,914 A | 12/2000 | Ben-David et al. |
| 6,160,596 A | 12/2000 | Sylvester et al. |
| 6,191,826 B1 | 2/2001 | Murakami et al. |
| 6,198,512 B1 | 3/2001 | Harris |
| 6,220,710 B1 | 4/2001 | Raj et al. |
| 6,231,190 B1 | 5/2001 | Dewald |
| 6,236,390 B1 | 5/2001 | Hitchcock |
| 6,236,406 B1 | 5/2001 | Li |
| 6,239,783 B1 | 5/2001 | Hill et al. |
| 6,243,070 B1 | 6/2001 | Hill et al. |
| 6,246,396 B1 | 6/2001 | Gibson et al. |
| 6,256,073 B1 | 7/2001 | Pettitt |
| 6,259,430 B1 | 7/2001 | Riddle et al. |
| 6,262,710 B1 | 7/2001 | Smith |
| 6,262,744 B1 | 7/2001 | Carrein |
| 6,280,034 B1 | 8/2001 | Bemnesholtz |
| 6,304,237 B1 | 10/2001 | Karakawa |
| 6,324,006 B1 | 11/2001 | Morgan |
| 6,366,291 B1 | 4/2002 | Taniguchi et al. |
| 6,380,961 B1 | 4/2002 | Van Der Loop et al. |
| 6,384,839 B1 | 5/2002 | Paul |
| 6,388,648 B1 | 5/2002 | Clifton et al. |
| 6,407,766 B1 | 6/2002 | Ramanujan et al. |
| 6,456,301 B1 | 9/2002 | Huang |
| 6,459,425 B1 | 10/2002 | Holub et al. |
| 6,467,910 B1 | 10/2002 | Sato |
| 6,498,592 B1 | 12/2002 | Matthies |
| 6,538,742 B1 | 3/2003 | Ohsawa |
| 6,570,584 B1 | 5/2003 | Cok et al. |
| 6,577,291 B2 | 6/2003 | Hill et al. |
| 6,580,482 B1 | 6/2003 | Hiji et al. |
| 6,594,387 B1 | 7/2003 | Pettitt et al. |
| 6,595,648 B1 | 7/2003 | Woodgate et al. |
| 6,633,302 B1 | 10/2003 | Ohsawa et al. |
| 6,687,414 B1 | 2/2004 | Edgar |
| 6,707,516 B1 | 3/2004 | Johnson et al. |
| 6,750,992 B1 | 6/2004 | Holub |
| 6,833,888 B2 | 12/2004 | Song et al. |
| 6,870,523 B1 | 3/2005 | Ben-David et al. |
| 6,882,384 B1 | 4/2005 | Sharp |
| 6,897,876 B2 | 5/2005 | Murdoch et al. |
| 6,952,194 B1 | 10/2005 | Yamazaki et al. |
| 6,972,736 B1 | 12/2005 | Wada et al. |
| 7,129,955 B2 | 10/2006 | Motomura |
| 7,136,083 B2 | 11/2006 | Tezuka et al. |
| 7,206,005 B2 | 4/2007 | Yamashita et al. |
| 7,268,757 B2 * | 9/2007 | Ben-David et al. ............ 345/88 |
| 7,492,379 B2 | 2/2009 | Credelle et al. |
| 2002/0005829 A1 | 1/2002 | Ouchi |
| 2002/0015046 A1 | 2/2002 | Okada et al. |
| 2002/0024618 A1 | 2/2002 | Imai |
| 2002/0051111 A1 | 5/2002 | Greene et al. |
| 2002/0054424 A1 | 5/2002 | Miles |
| 2002/0060689 A1 | 5/2002 | Iwata et al. |
| 2002/0061369 A1 | 5/2002 | Kunimatsu et al. |
| 2002/0097365 A1 | 7/2002 | Yang et al. |
| 2002/0122019 A1 | 9/2002 | Baba et al. |
| 2002/0149546 A1 | 10/2002 | Ben-Chorin et al. |
| 2002/0163526 A1 | 11/2002 | Haseltine et al. |
| 2002/0167528 A1 | 11/2002 | Edje |
| 2002/0186229 A1 | 12/2002 | Brown Elliott |
| 2002/0191130 A1 | 12/2002 | Liang et al. |
| 2003/0085906 A1 | 5/2003 | Elliott et al. |
| 2003/0146891 A1 | 8/2003 | Poliakine |
| 2004/0177323 A1 | 9/2004 | Kaasila et al. |
| 2007/0001994 A1 | 1/2007 | Roth |
| 2008/0024410 A1 | 1/2008 | Ben-David et al. |
| 2008/0030447 A1 | 2/2008 | Ben-David et al. |

FOREIGN PATENT DOCUMENTS

| | | |
|---|---|---|
| EP | 0547603 | 6/1993 |
| EP | 0653879 | 5/1995 |
| EP | 1087341 | 3/2001 |
| JP | 59-159131 | 9/1984 |
| JP | 60263122 | 12/1985 |
| JP | 6222774 | 9/1987 |
| JP | 3092888 | 4/1991 |
| JP | 07043658 | 2/1995 |
| JP | 8-248410 | 9/1996 |
| JP | 08-280038 | 10/1996 |
| JP | 09-230301 | 9/1997 |
| JP | 09-251160 | 9/1997 |
| JP | 10-307205 | 11/1998 |
| JP | 11-052327 | 2/1999 |
| JP | 2000-116789 | 4/2000 |
| JP | 2000-171799 | 6/2000 |
| JP | 2000253263 | 9/2000 |
| JP | 2000-347324 | 12/2000 |
| JP | 2000338950 | 12/2000 |
| JP | 2001306023 | 11/2001 |
| JP | 2002091369 | 3/2002 |
| WO | WO 95/10160 | 4/1995 |
| WO | WO 97/35424 | 9/1997 |
| WO | WO 97/40621 | 10/1997 |
| WO | WO 97/42770 | 11/1997 |
| WO | WO 01/95544 | 12/2001 |
| WO | WO 02/11112 | 2/2002 |
| WO | WO 02/50763 | 6/2002 |
| WO | WO 02/091299 | 11/2002 |
| WO | WO 02/091348 | 11/2002 |
| WO | WO 02/091349 | 11/2002 |
| WO | WO 02/099557 | 12/2002 |
| WO | WO 02/101644 | 12/2002 |
| WO | WO 03/058587 | 7/2003 |

OTHER PUBLICATIONS

U.S. Appl. No. 10/017,546, dated Dec. 18, 2001, Ben-Chorin et al.
Supplementary European Search Report of Application No. 03715317 dated Jan. 20, 2009.

International Search Report of Application No. PCT/IL03/00307 dated Sep. 11, 2003.
Ken-ichi Takatori et al., "Field-Sequential Smectic LCD with TFT Pixel Amplifier", Functional Devices Research Labs, NEC Corp., Kawasaki, Kanagawa 216-8555, Japan, SID 01 Digest.
"A critical view of Spectral Models Applied to Binary Color Printing", Wyble and Berns, Color Research and Application, vol. 25, 2000, pp. 4-19.
Jeffrey A. Shimizu, "Scrolling Color LCOS for HDTV Rear Projection", SID 01 Digest, pp. 1072-1075.
Francisco H. Imai, Color Science; "Spectral reproduction from scene to hardcopy", Part 1-Multi-spectral acquisition and spectral estimation using a Trichromatic Digital Camera System associated with absorbtion filters.
Rosen et al., "Spectral Reproduction from Scene to Hardcopy II", Image Processing, Munsell Color Science Laboratory, RIT-Proceeding of SPIE, vol. 4300 (2001).
Pointer, M.R., "The Gamut of Real Surface Colors", Color Research & Appl. 5(3):145-155, 1980.
Ajito et al., "Expanded Color Gamut Reproduced by Six-Primary Projection Display", Proc., SPIE, vol. 2954 (2000), pp. 130-137.
Ajito et al., "Multiprimary Color Display for Liquid Crystal Display Projectors Using Diffraction Granting", Optical Eng. 38(11), 1883-1888 (Nov. 1999).
Ajito et al., "Color Conversion Method for Multiprimary Display Using Matrix Switching", Optical Review, vol. 9, No. 3 (Dec. 2001), 191-197.
Gunter Wyszecki and W.S. Stiles, Color Science: Concepts and methods, Quantative Data and Formulae, 2d Ed., 1982, pp. 179-183.
Elliott et al., "13.3: Co-Optimization of Color AMLCD Subpixel Architecture and Rendering Algorithms", ClairVoyante Laboratories, USA and AMLCD, Semiconductor Bussiness, Korea, pp. 1-4.
Elliott, Elliott, C., "Active Matrix Display Layout Optimization for Sub-pixel Image Rendering", Clairvoyante Laboratories, USA, pp. 1-5.
Betrisey et al., "20.4: Displaced Filtering for Patterned Displays", Microsoft Corporation, Society for Information Display, 2000, SID, pp. 1-4.
Daly, Scott, "47.3: Analysis of Subtriad Addressing Algorithms by Visoal System Models", Center for Displayed Appearance, Sharp Laboratories of America, Camas, WA, USA, 2001, SID, pp. 1200-1203.
Klompenhouwer et al., "13.4: Subpixel Image Scaling for Color Matrix Displays", Philips Research Laboratories, Einhoven, The Netherlands, 2002, SID, pp. 176-179.
Credelle et al., "9-2:MTF of High-Resolution PenTile Matrix Displays", Eurodisplay 2002, pp. 159-162.
Platt, J., "Optimal Filtering for Patterned Displays", Microsoft Research, pp. 1-4.
Hiyama et al., "LN-3: Four-Primary Color 15-in. XGA TFT-LCD with Wide Color Gamut", Japan, Eurodispaly 2002, pp. 827-830.
Sugiura et al., "P-24: LCD Module Adopting a Color Conversion Circuit", Japan, SID, 2002, pp. 288-291.
Supplementary European Search Report for EP 03706857 Date: Sep. 20, 2006.
Yamaguchi et al., "Color image reproduction based on the multispectral and multiprimary imaging: Experimental evaluation", Device Independent Color, Color Hardcopy and applications VII, Proc. SPIE, vol. 4663, pp. 15-26 (2002).
Yamada et al., "12.1:LED Backlight for LCDs", IBM Research, Tokyo Research Laboratory, Yamato, Japan, 1998, SID, pp. 1-4.
Keith Jack, Video Demystified, $3^{rd}$ Edition, LLH Technology Publishing 2001, pp. 215-219.
Sugiura, T, "11.4:Invited Paper, EBU color Filter for LCDs", Troppan Printing Co., Japan, SID, 2001. pp. 146-149.
Horibe et al., "High Efficiency and High Visual Quality LCD Backlighting System", Faculty of Science and Technology, Kelo University, Japan, pp. 1-4.
International Search Report of Application No. PCT/IL02/00452, mailed on Dec. 9, 2002.
International Search Report of Application No. PCT/IL03/00020.
Supplementary European Search Report of Application No. 02733203 dated Sep. 25, 2005.
Supplementary European Search Report of Application No. 04011262 dated Oct. 17, 2005.
Japanese Office Action of Application No. 2003-585062 mailed on Jan. 9, 2009.
Chinese Office Action of Application No. 02815277.8 mailed on Oct. 27, 2006.
"Parameter Values for the HDTV standards for Production and International Programme Exchange", Rec. ITU-R BT. 709-3, (1990-1994-1995-1998), pp. 1-28.
Japanese Office Action of Application No. 2003-504324 dated May 19, 2006.
Japanese Office Action of Application No. 2003-585062 mailed on Aug. 18, 2009.
International Search Report of Application No. PCT/IB04/050016 dated May 27, 2004.
Chinese Office Action of Application No. 200480002948.5 dated Jun. 8, 2007.
Japanese Office Action of Application No. 2003-585062 dated Oct. 19, 2010.
Indian Office Action of Application No. 2557/CHENP/2004 dated Aug. 9, 2010.

* cited by examiner

OPTIMAL SUBPIXEL ARRANGEMENT FOR DISPLAYS WITH MORE THAN THREE PRIMARY COLORS

The present invention relates to a display comprising a plurality of first, second, third and fourth display elements, which are controllable to display first, second, third and fourth primary colors, respectively.

Vision is the sense, mediated by the eyes, by which the qualities of an object (such as color, luminosity, shape and size) constituting its appearance are perceived.

Color is defined as an attribute of visual perception consisting of any combination of chromatic and achromatic content. This attribute can be described by chromatic color names such as yellow, orange, brown, red, pink, green, blue, purple, etc., or by achromatic color names such as white, grey, black, etc., and qualified by bright, dim, light, dark, etc., or by combinations of such names.

A perceived color depends on the spectral distribution of the color stimulus, on the size, shape, structure and surround of the stimulus area, on the state of adaptation of the observer's visual system, and on the observer's experience of the prevailing and similar situations of observations.

The unrelated attributes of color are brightness, hue and saturation. Brightness is the attribute of a visual sensation according to which an area appears to emit more or less light. Hue is an attribute of a visual sensation according to which an area appears to be similar to one of the perceived colors, e.g. red, yellow, green, and blue, or to a combination of them. Saturation is the colorfulness, chromaticness, of an area judged in proportion to its brightness.

The related attributes of color are lightness, colorfulness and chroma. Lightness is defined as the brightness of an area judged relative to the brightness of a similarly illuminated area that appears to be white or highly transmitting. Colorfulness is an attribute of a visual sensation according to which the perceived color of an area appears to be more or less chromatic. Chroma is defined as the colorfulness, chromaticness of an area judged as a proportion of the brightness of a similarly illuminated area that appears white or highly transmitting.

In the retina of the eye there are three different types of light sensors. These sensors are called the L, M and S cones, which are sensitive to light with long (L), medium (M) and short (S) wavelengths, respectively. Each type of sensor is connected with neurones to the brain. When light falls on a cone it will start to send pulses to the brain when it is sensitive to the wavelength of the light. FIG. 1 shows the spectral sensitivities of L, M and S cones in the human eye. The more light falls on the cones the quicker they will send pulses ("fire spikes") to the brain.

The color of the light that enters the eye is determined by the relative amount of pulses that each of the three types of cones sends to the brain. Blue light (wavelength approximately 400-450 nm), for example, results in more spikes from the S cones than from the L cones or the M cones.

Because the human eye has only three types of cones, there are a number of different light spectra that give the same color sensation. For example, sunlight and the light from a fluorescent lamp are both perceived as white in color, but whereas the sunlight has a very broad spectrum with about equal intensity for each wavelength, the fluorescent lamp has a spectrum with only a few peaks. This effect of different light spectra giving the same color sensation is called metamerism, and two spectra which give the same color sensation are called metamers.

Another effect of having only three types of cones is that different colors can be made by adding together the light of two light sources while varying the relative intensity of these light sources. If red light and green light are mixed, it may be perceived as yellow. If a first light source emitting red light is set to full intensity and a second light source emitting green light is set to zero intensity, and the intensity of the green light is increased while the intensity of the red light is decreased, the color changes from red, to orange, to yellow, and finally to green.

Displays use this principle to make many colors with only three primary colors; usually red, green and blue.

In order to predict the color sensation that we get from the light that enters our eyes, a number of models have been developed. One of these models, which is most commonly known and which is standardised by the CIE (Commission Internationale d'Éclairage—International Commission on Illumination) is the CIE 1931 model. It defines three spectral matching functions for the standard observer that can be used to calculate the tri-stimulus values X, Y, and Z, respectively, for a light with a certain spectrum. From these tri-stimulus values the chromaticity coordinates x and y can be calculated as follows:

$$x = \frac{X}{X + Y + Z} \quad (1)$$

$$y = \frac{Y}{X + Y + Z} \quad (2)$$

Y is related to the perceptual attribute brightness, the x and y coordinates determine the chromaticity, where x is the red-green axis and y is the yellow-blue axis.

The relation between colors (while ignoring the intensity, Y) can now be plotted in a two-dimensional chromaticity diagram, such as FIG. 2. It shows the chromaticity coordinates of the spectral colors by the curved line and indicates the corresponding wavelengths in nanometers (nm). Chromaticity coordinates for all visible colors are on the horseshoe shaped area inside the curved line. The straight line at the bottom of the chart (the purple line) connects the red and the blue spectral colors, so that non-spectral colors obtained by mixing red and blue (e.g. purple, violet, etc.) are located along this line. The chromaticity coordinate of a white object in daylight is designated D in FIG. 2. The direction and the distance of a certain point in the chromaticity diagram to the white point determine its hue and saturation.

As mentioned previously, mixing the light of two colors can create a new color. The chromaticity coordinate of this new color is on an imaginary straight line between the two colors. Mixing green (G) and cyan (C) will for instance give a color whose chromaticity coordinate is on the broken line 21 between G and C as given in FIG. 2. By adding a third color, e.g. red (R), all colors within an imaginary triangle, spanned by R, G, and C can be made. By mixing light of six different primary colors (e.g. R, Y, G, C, B, M), all colors with chromaticity coordinates in the patch R, Y, G, C, B, M, i.e. inside a polygon, the corners of which are R, Y, G, C, B, and M, can be made.

The chromaticity diagram only shows the proportions of tristimulus values; hence bright and dim colors having the same tristimulus proportions belong to the same point. For this reason, the illuminant point D also represents grey colors; and orange and brown colors, for example, tend to plot at similar positions to each other.

The subject matter of color vision is further elucidated in e.g. Roy S. Berns, Fred W. Billmeyer, and Max Saltzman; Billmeyer and Saltzman's Principles of Color Technology, 3rd Edition; ISBN 0-471-19459-X, hereby incorporated in its entirety by this reference.

The present invention relates to the field of displays in general, and in particular to liquid crystal displays (LCD), cathode ray tube (CRT) displays, flat intelligent tube (FIT) displays, light emitting diode (LED) displays, all of which will be explained briefly in the following, as well as to plasma display panels (PDP), PolyLED displays, organic light emitting displays (OLED), field emission displays (FED), and foil displays.

In prior art, liquid crystal displays have proven themselves suitable for various applications which necessitate compactness and low power consumption. A liquid crystal display (LCD) is a flat panel display device having the advantages of small bulk, small thickness and low power consumption.

LCDs have been used in connection with portable devices such as mobile telephones, portable computers, electronic calendars, electronic books, televisions or video game controls and various other office automation equipment and audio/video machinery, etc.

LCDs control an electric field which is applied to a liquid crystal material having a dielectric anisotropy to modulate light, thereby displaying a picture or an image, all in a fashion that is known per se as is recognized by those skilled in the art. Unlike display devices that generate light internally—such as electro luminescence (EL) devices, cathode ray tubes (CRT) and light emitting diodes (LED)—LCDs use an external light source.

Normally, an LCD display is designed as a liquid crystal panel, comprising a matrix of essentially rectangular display elements (pixels) which are controllable to transmit or reflect light depending on the properties of the liquid crystal mixture, which generally is injected between two transparent substrates, the display in addition comprising row and column conductors for supplying voltages to selected parts of the display, via associated electronics such as row and column drivers, as will be recognized by the skilled man.

LCD devices are broadly classified into transmissive type devices and reflective type devices, depending on the method of utilizing light. Transmissive type LCDs include a back light unit for supplying light to the liquid crystal panel.

Light emitting diodes (LED) have been used to create big screen devices such as jumbo-TVs. Depending on the desired pixel size, a number of red, green and blue light emitting diodes may be grouped together to form a single display element, corresponding to a pixel in an LCD display. Such display elements are subsequently arranged in a rectangular matrix and connected to necessary electronics as will be recognized by the skilled man.

FIG. 3 is a schematic illustration of the fundamental principle of the cathode ray tube (CRT), which is comprised in many TVs in use today as well as in many other display devices. A cathode 31, for instance a heated filament, is arranged inside a glass tube 32, in which a vacuum has been created. Electrons are naturally released from the heated cathode 31 and migrate into the tube 32. An anode 33 attracts the electrons, which are released from the cathode 31, thus forming a beam or ray of electrons 34. In the cathode ray tube 32 of a television set, the beam of electrons 34 is focused by a focusing anode 33 into a tight beam and then accelerated by an accelerating anode 35. The beam of electrons 34 flies through the vacuum inside the tube 32 and hits a flat screen 36 at the other end of the tube 32. This screen 36 is coated with phosphor 37, which glows when struck by the electron beam 34. A conductive coating inside the tube soaks up the electrons which pile up at the screen-end of the tube.

In order to provide means to guide the beam 34, the tube 32 in a typical CRT display device is wrapped in steering coils 38, 39. The steering coils 38, 39 are simply copper windings, which are able to create magnetic fields inside the tube, and the electron beam 34 responds to the fields. A first set of coils 38 creates a magnetic field that moves the electron beam vertically, while a second set of coils 39 moves the beam horizontally. By controlling the voltages applied to the coils 38, 39, the electron beam 34, can be positioned at any point on the screen 36.

A color CRT display comprises three electron beams, typically denoted as the red, green and blue beams, which move simultaneously across the screen. Instead of the single sheet of phosphor which is arranged at the screen in black-and-white CRT display devices, the screen in a color CRT display is coated with red, green and blue phosphors arranged in dots or stripes. On the inside of the tube, very close to the phosphor coating, there is arranged a thin metal screen, i.e. the shadow mask. This mask is perforated with very small holes that are aligned with the phosphor dots (or stripes) on the screen.

A red dot may be created by firing the red beam at the red phosphor, whereas green and blue dots are created in a corresponding fashion. To create a white dot, red, green and blue beams are fired simultaneously—the three colors mix together to create white. To create a black dot, all three beams are turned off as they scan past the dot. All other colors on a color CRT display are combinations of red, green and blue. CRT displays are typically time sequential displays, which implies that an image is built up by repeatedly scanning the beam(s) over the screen, whereupon an image is displayed, all in a manner known per se as will be appreciated by the skilled man.

The Flat Intelligent Tube (sometimes referred to as FIT or FIT) is a new cathode ray tube (CRT) technology without a shadow mask. The primary function of the shadow mask, i.e. color selection, is managed by an electronic control system that guides the electron beams over the correct phosphor lines. The position of the beams is detected by means of dedicated structures on the faceplate.

FIG. 4 is a simplified representation of the tracking principle in a FIT. In the FIT, the beams 34 are scanned along horizontal phosphor lines 41, in contrast to mask-less CRTs of the index type developed in the past in which a single beam was scanned perpendicularly to the vertical phosphor lines. The FIT approach is quite similar to that of a CD-player wherein a laser beam is guided over a spiral by means of a tracking system. The beam 34 is scanned along a horizontal phosphor line 41 and any deviation from this line is corrected by means of a feedback system. On tracks situated above and below each phosphor line 41, position detectors 42 are present (e.g. conducting stripes that measure the current). A control system 43, fed by information from these detectors 42, drives correction coil(s) 44 in such a way that the beam trajectories coincide with the phosphor lines 41.

In the CRT and FIT displays, the phosphor dots or stripes constitute the display elements, which accordingly are controllable to emit light having a predetermined wavelength (color).

In prior art RGB color displays, the displayable color gamut is limited to a color triangle, which is spanned by three primary colors, e.g. red, green and blue (as illustrated in FIG. 2). Colors outside this color triangle, e.g. gold and turquoise (in a case where the primary colors are red, green and blue), cannot be displayed and are consequently clipped towards colors that can be displayed, e.g. more unsaturated yellow and more bluish green. It is known that adding one or more additional primary colors to the three primary colors used in most present applications offers a possibility to expand the displayable color gamut.

Spatial resolution is the ability of a display system to display two objects that are close to each other as separate dots. For all display types that cannot project various color pixels on top of each other, the addition of a sub-pixel with a different-colored primary yields a reduction in the spatial resolution of the display if the number of sub-pixels remains equal.

The smallest switching element is the sub-pixel. If the sub-pixels are made smaller, there can be four sub-pixels in one pixel having the same size as a pixel with three sub-pixels. This however is costly and generally speaking resolution decreases as the amount of sub-pixels increases. If, on the other hand, the size of sub-pixels is kept constant and four, instead of three, sub-pixels are used to form a pixel, the pixel resolution will decrease.

Furthermore, the addition of more than three colors may result in errors relating to color, luminance and image homogeneity.

It is accordingly a disadvantage that the addition of one or more primary colors in matrix displays results in a reduction of the overall image quality.

It is an object of the invention to provide a display, wherein the reduction of the overall image quality, particularly the color and luminance errors, resulting from the addition of one or more primary colors, is limited.

It is another object of the invention to provide a display, wherein an optimal arrangement of the display elements results in an increased homogeneity in color and luminance.

It is another object of the invention to provide a display, wherein black and white transitions on sub-pixel level without color artefacts can be generated using sub-pixel algorithms.

The present invention relates to a display comprising a plurality of first, second, third and fourth display elements, which are controllable to display first, second, third and fourth primary colors, respectively, characterized in that a particular pair of said display elements, which represents a maximum color distance compared to other pairs of said display elements, is arranged such that there is a minimal spatial distance between the elements of said particular pair or that the elements of said particular pair are situated next to each other.

The measures as defined in claims 2-6 have the advantages that they constitute increasingly optimal solutions to the problem of maximizing color distance while minimizing the spatial distance between display elements.

The measures as defined in claims 7-12 have the advantage that these colors are particularly suitable for use in color displays.

The measure as defined in claim 13 has the advantage of increased image quality due to an improved distribution of the luminance.

These and other aspects of the invention will be apparent from and elucidated with reference to the embodiments described hereinafter.

Essentially speaking, the invention relates to a new and innovative method of arranging the display elements of a matrix display having four or more primary colors. According to the invention, the optimal arrangement will result in the best homogeneity in color and luminance. In addition, the arrangement according to the invention will limit the color and luminance errors.

An important aspect of the invention is the fact that although the display resolution on pixel level is lower, black and white transitions on sub-pixel level can be made without color artefacts as illustrated in FIG. 14 and FIG. 15 when using so-called sub-pixel algorithms.

FIG. 12 is a schematic illustration of the arrangement of sub-pixels in a six-color display according to a second embodiment of the invention, wherein RGB-stripes and CMY-stripes alternate in subsequent rows and columns.

FIG. 13 is a schematic illustration of the arrangement of sub-pixels in a six-color display according to a third embodiment of the invention, wherein RGBCMY-stripes and CMYRGB-stripes are arranged alternatingly.

Prior art multicolor displays comprise displays with red, green and blue primary colors; and an additional primary color such as yellow or white. In an LCD with four primary colors, each pixel is built up out of four "sub-pixels": e.g. a red, a green, a blue and a yellow sub-pixel constitute a pixel.

When selecting an additional primary color, its impact on the luminance and the color gamut of a display should be taken into account. When considering the luminance alone, a primary color with a high luminance, such as those in the triangle yellow-white-green, appears desirable. Regarding the color gamut, with a view to extending the color gamut as much as possible, a highly saturated yellow, cyan or magenta would be preferred.

Yellow is furthermore a color which carries much brightness, and therefore its absence is easily detected; and this is why adding more saturated yellow colors generally is most appreciated from a perception point of view. Considering all requirements, a yellow primary would be the best choice of an additional primary color in an RGB-display.

Figure 1:
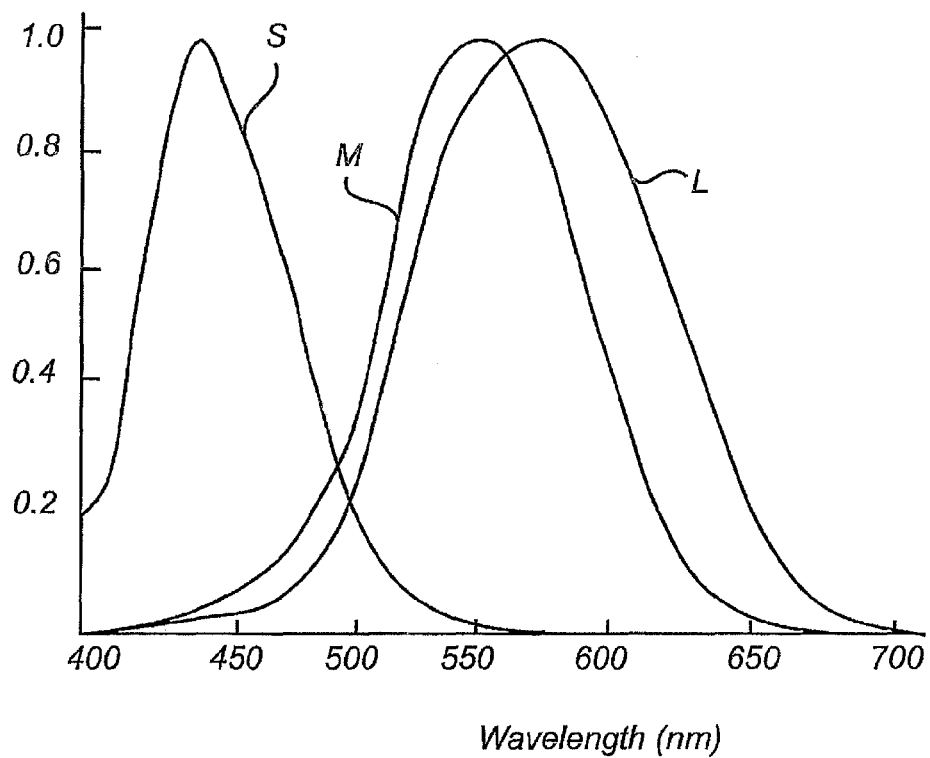
FIG. 1 shows the spectral sensitivities of L, M and S cones in the human eye.

FIG. 1 illustrates the sensitivity of the cones in the human eye to light of various colors. The eye is very sensitive to yellow light (570 to 580 nm), which is why adding a yellow primary color to a prior art display with only red, green, and blue primary colors (RGB-display) would substantially improve the overall brightness of a displayed image and the image quality.

A color other than yellow could nevertheless be a suitable fourth primary color if images of some special type were to be displayed. There may be several applications relating to the field of medical imaging or to the field of printing, wherein the first choice of an additional primary color would be a color other than yellow. Although the colors red, blue, green, cyan, magenta and yellow are mentioned as suitable colors in preferred embodiments of the invention, this should not be considered as a limitation on the invention.

Figures 5, 6, 7:
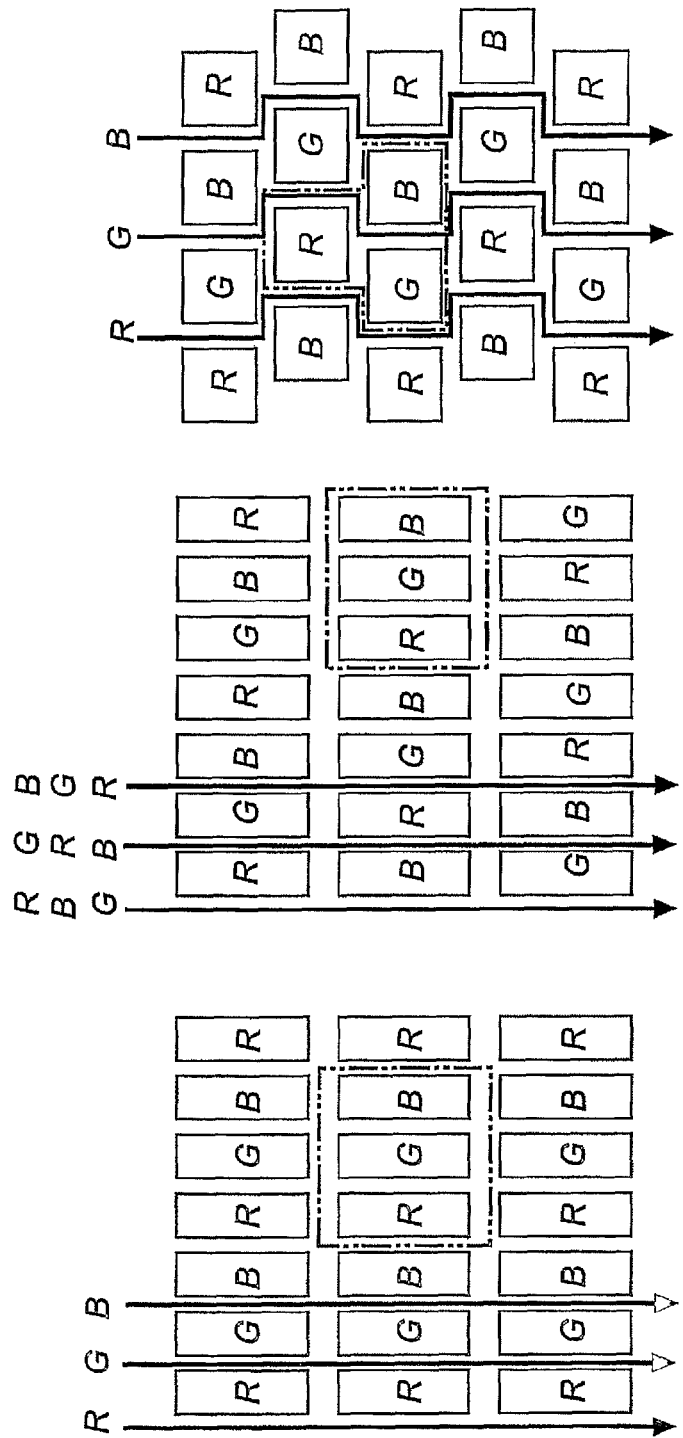
FIG. 5 is a schematic illustration of the stripe-arrangement of sub-pixels in prior art color displays.
FIG. 6 is a schematic illustration of the mosaic-arrangement of sub-pixels in prior art color displays.
FIG. 7 is a schematic illustration of the delta-arrangement of sub-pixels in prior art color displays.

In current color displays (with primary colors red (R), green (G) and blue (B)), the sub-pixels are usually configured according to one of the three patterns shown in FIGS. 5, 6, and 7.

FIG. 5 is a schematic illustration of the stripe-arrangement of sub-pixels in prior art color displays. The stripe-arrangement implies a simple array design, simple fabrication procedures and simple driving circuitry, but a poor color homogeneity.

FIG. 6 is a schematic illustration of the mosaic-arrangement of sub-pixels in prior art color displays. The mosaic-arrangement implies a simple array design, and a better color homogeneity, but at the cost of a more difficult fabrication procedure, and a more complex driving circuitry.

FIG. 7 is a schematic illustration of the delta-arrangement of sub-pixels in prior art color displays. The delta-arrangement implies the best color homogeneity and a simple driving circuitry, but at the cost of a more difficult fabrication procedure and a more complex array design.

The stripe arrangement of FIG. 5 is the most popular, followed by the mosaic arrangement of FIG. 6 and the delta arrangement of FIG. 7. The embodiments of the invention will mainly be described with reference to the stripe arrangement, which should not be considered to be a limitation on the invention, since the invention can be embodied in a variety of display arrangements and display types.

Figure 2:
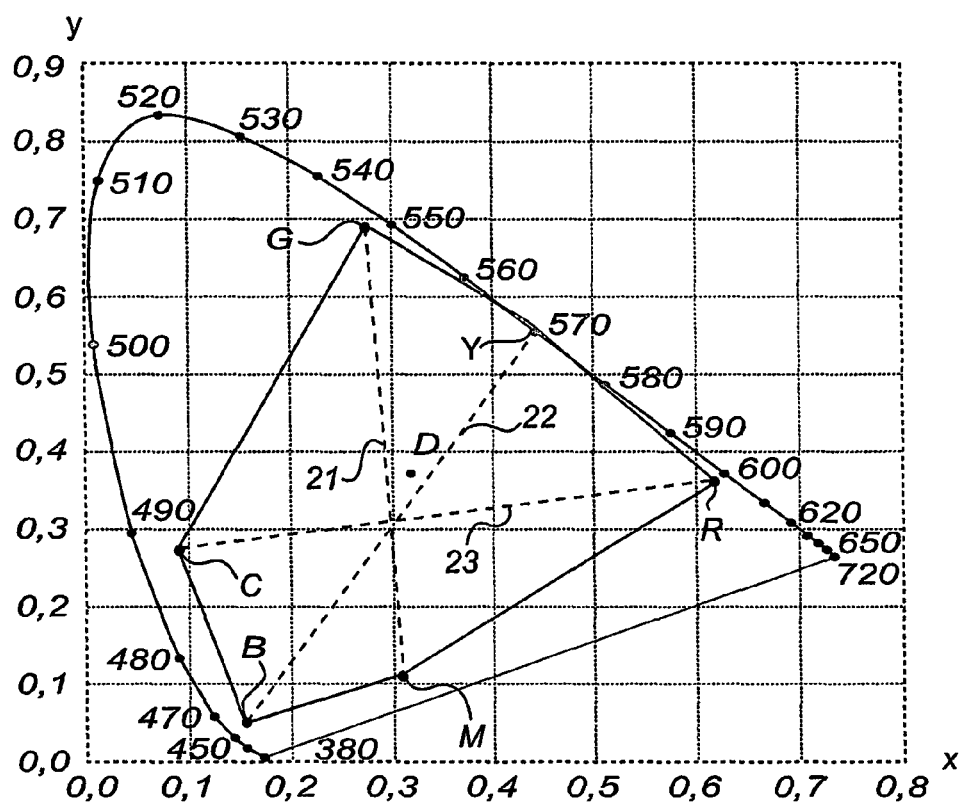
FIG. 2 is a chromaticity diagram.
Figure 3:
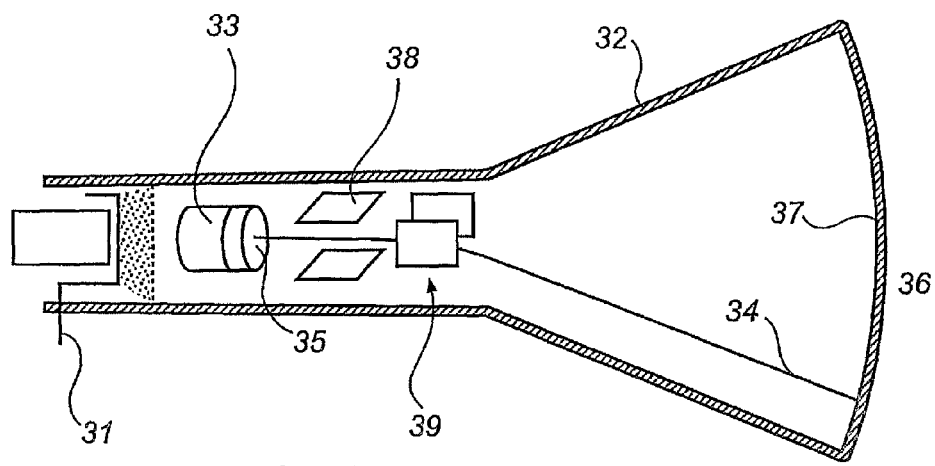
FIG. 3 is a schematic illustration of the fundamental principle of a cathode ray tube (CRT).
Figure 4:
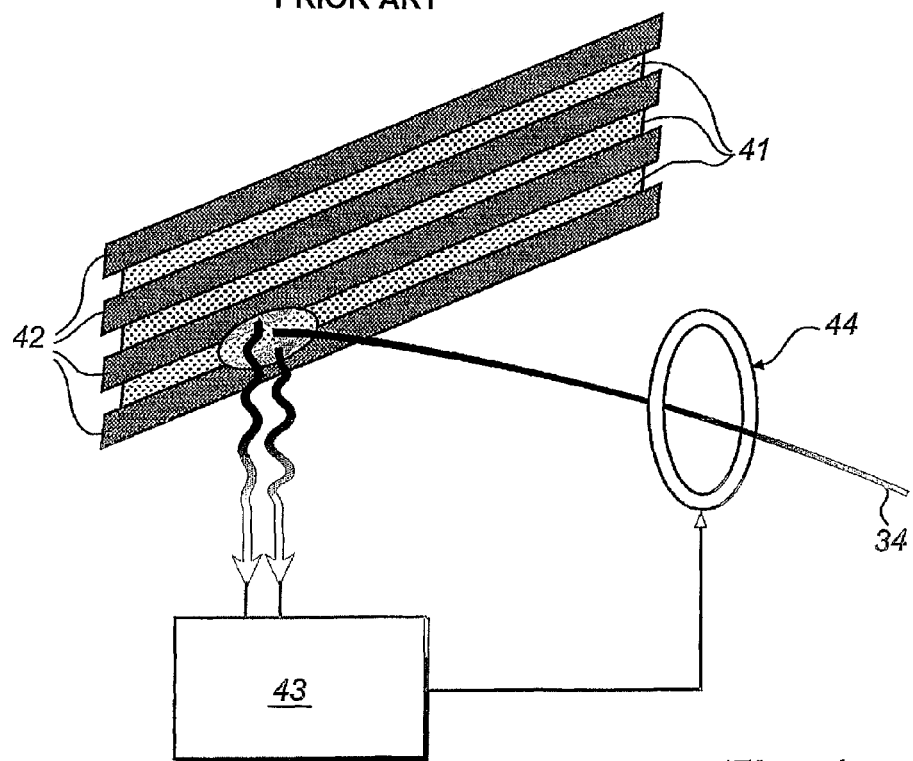
FIG. 4 is a simplified representation of the tracking principle in a Flat Intelligent Tube (FIT).
Figure 8:
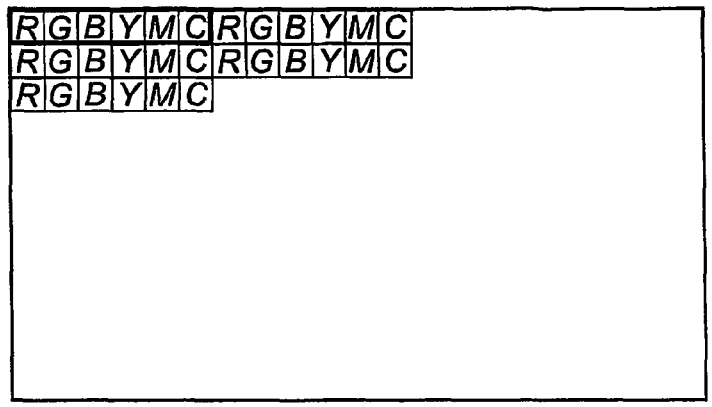
FIG. 8 is a schematic illustration of an RGBYMC-stripe-arrangement of sub-pixels in a six color display.

In human perception, homogeneity has an impact on the overall perceived quality of a display. The problems relating to deficiencies in the perceived homogeneity of a display which the invention seeks to remedy are most readily illustrated in the case of a display with six colors, namely red, green, blue, yellow, magenta and cyan (an RGBYMC-display). FIG. 2 illustrates exemplary chromaticity coordinates of R, G, B, Y, M and C in a RGBYMC display. FIG. 8 is a schematic illustration of an RGBYMC-stripe-arrangement of sub-pixels in a six-color display. The display screen comprises a matrix of pixels, which in turn are built up of a repeated arrangement of red (R), green (G), blue (B), yellow (Y), magenta (M) and cyan (C) sub-pixels.

The display is furthermore comprised of several components such as row and column conductors (not shown), connected to electronics (not shown), such as row and column drivers, all in a manner known by the skilled man and therefore not described here in order not to obscure the invention in unnecessary detail. If a six-color display is designed in a prior art stripe-arrangement according to FIG. 8, the color homogeneity (color mix) will be very poor.

Figure 9:
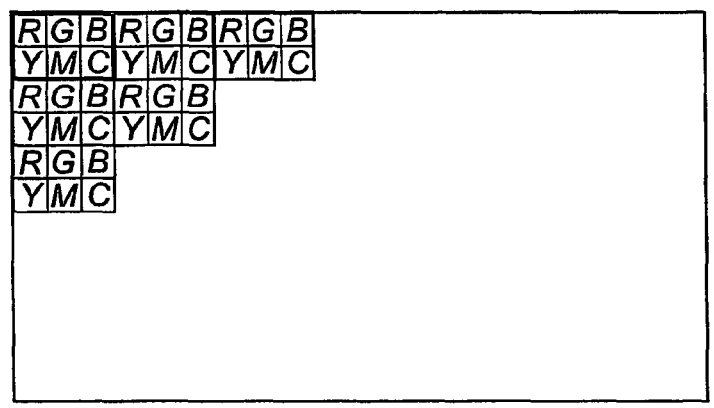
FIG. 9 is a schematic illustration of the arrangement of sub-pixels in a six-color display, wherein RGB-stripes and YMC-stripes alternate in subsequent rows.

A much better color homogeneity can be obtained with an alternating stripe arrangement of RGB- and YMC-stripes according to FIG. 9, wherein RGB-stripes and YMC-stripes alternate in subsequent rows.

Figure 10:
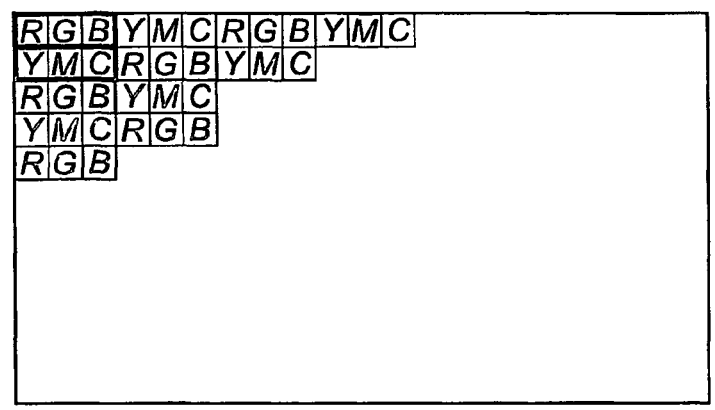
FIG. 10 is a schematic illustration of the arrangement of sub-pixels in a six-color display, wherein RGB-stripes and YMC-stripes alternate in subsequent rows and columns.

An even better embodiment is to alternate RGB-stripes and YMC-stripes between subsequent rows and columns according to FIG. 10, which nevertheless results in approximately the same homogeneity in color as the previous arrangement.

The distance between two colors, the color distance, denotes the distance between two colors in the CIE chromaticity diagram, i.e. the length of a straight line, drawn through the points (chromaticity coordinates) which represent said two colors. In FIG. 2, the color distance between green and magenta is illustrated with a broken straight line going from green (G) to magenta (M).

If a first color has the chromaticity coordinates $x_1$, $y_1$ in the CIE chromaticity diagram and a second color has the chromaticity coordinates $x_2$, $y_2$ in the CIE chromaticity diagram, one way of calculating the color distance $D_C$ is according to equation (3).

$$D_C = \sqrt{(x_1-x_2)^2 + (y_1-y_2)^2} \quad (3)$$

The color distance may nevertheless also be calculated in another way, wherein the human perception of the colors is taken into account, and wherein the color distance is the perceived color distance, either by individuals or groups of individuals, or in some other way.

The color distance could for instance be calculated in the CIE 1976 Yu'v' color space, wherein u' and v' are calculated from X, Y and Z according to the equations (4) and (5).

$$u' = \frac{4X}{(X+15Y+3Z)} \quad (4)$$

$$v' = \frac{9Y}{(X+15Y+3Z)} \quad (5)$$

The color distance between two colors may then be determined according to equation (6).

$$D_C = \sqrt{(u_1'-u_2')^2 + (v_1'-v_2')^2} \quad (6)$$

According to the invention, the best homogeneity can be obtained by arranging those primary colors that have the maximum color distance (i.e. are most distant from each other in the color space) at a minimal spatial distance from each other (i.e. close to one another), preferably next to each other, and furthermore by arranging the display elements so that the sub-pixels of the same colors are equally far apart spatially both in the horizontal direction and the vertical direction. Such a solution would link red to cyan, green to magenta and blue to yellow.

In FIG. 2, the maximum color distance between green (G) and any other of the five primary colors, namely the distance between green (G) and magenta (M) is illustrated as the broken line 21. Analogously, the maximum color distance between blue (B) and any other of the primary colors, namely the distance between blue (B) and yellow (Y), is illustrated as the broken line 22; and the maximum color distance between red (R) and any other of the primary colors, namely the distance between red (R) and cyan (C), is illustrated by the broken line 23.

Figure 11:
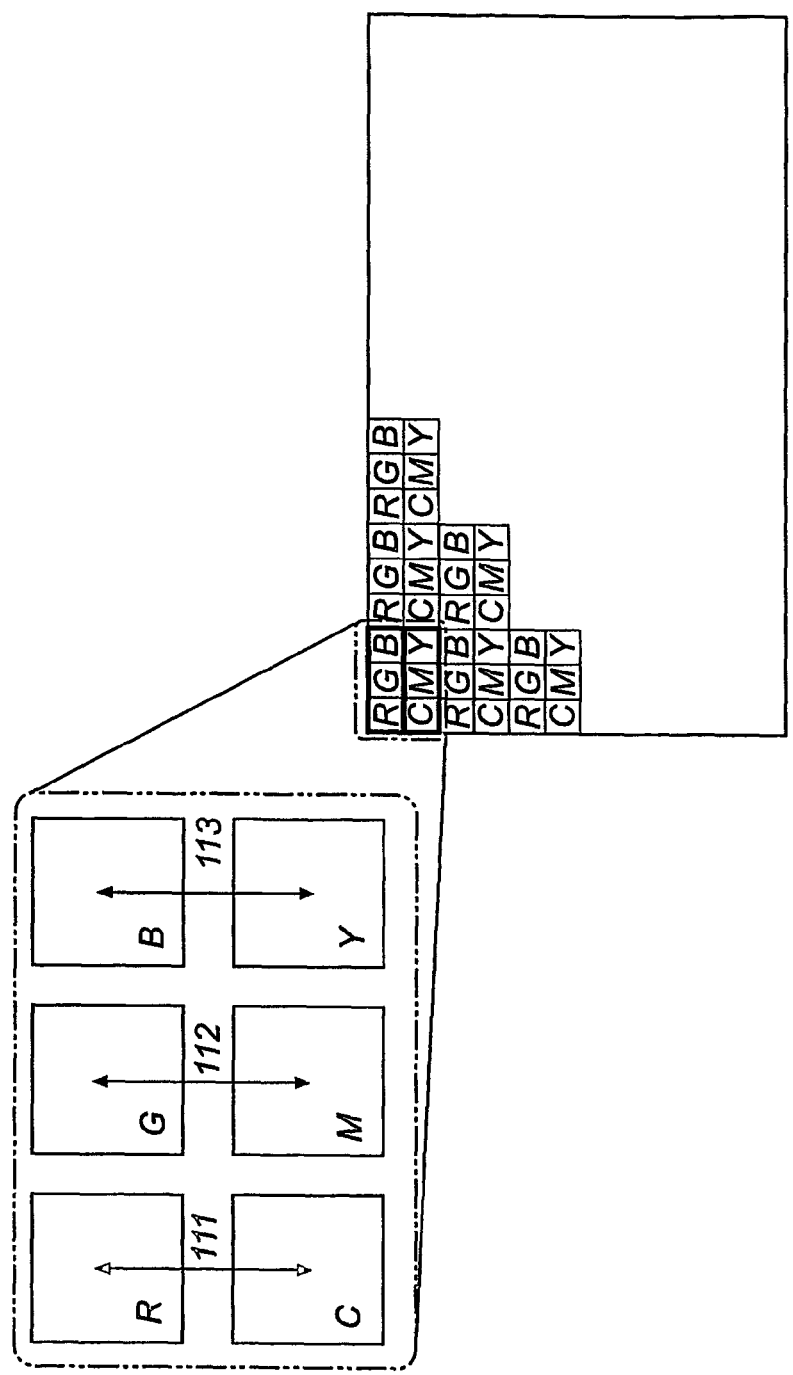
FIG. 11 is a schematic illustration of the arrangement of sub-pixels in a six-color display according to a first embodiment of the invention, wherein RGB-stripes and CMY-stripes alternate in subsequent rows.

According to a first embodiment of the invention, the display elements are arranged in an alternating stripe configuration, which would yield RGB- and CMY-stripes according to FIG. 11.

In the magnified section of FIG. 11, the spatial distances between the red (R) and cyan (C) pixel (111), the spatial distance between the green pixel (G) and the magenta (M) pixel (112), and the spatial distance between the blue pixel (B) and the yellow (Y) pixel (113) are illustrated.

In the embodiment of FIG. 11, said spatial distances 111, 112 and 113 are ideally minimized by arranging the display elements next to each other. The elements may be separated by a small physical distance between the elements, as illustrated in the magnified section of FIG. 11. According to a second embodiment of the invention, an alternative configuration of RGB- and CMY-stripes, illustrated in FIG. 12, is almost as good as the previous one.

Figures 12, 13:
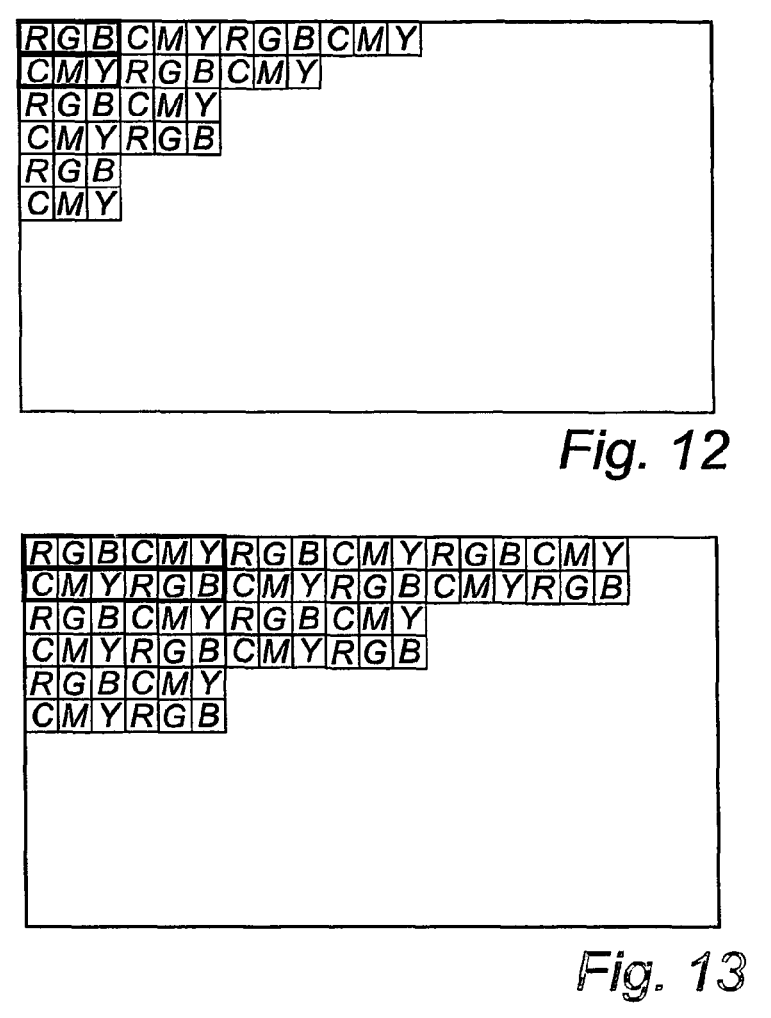

According to a third embodiment, an alternative arrangement of RGBCMY- and CMYRGB-stripes is proposed according to FIG. 13. Since the sub-pixels with the same color are not distributed equally in the horizontal and vertical directions, this embodiment is not a preferred one.

Using sub-pixel algorithms, the perceived resolution of a display can be increased substantially. This is already known for conventional RGB displays, but similar algorithms may be developed for RGBYMC displays. Such algorithms will perform optimally when white can be created at "near sub-pixel level". Of all possible arrangements, the arrangement of FIG. 11 again results in the best performance regarding this aspect, since white can be created with three pixels in the horizontal direction (RGB) or two pixels in the vertical direction (RC, GM, BY) starting from any sub-pixel in the image. This is in fact better than in RGB mosaic displays where three pixels in both the horizontal and the vertical directions are required. Note that the idea is equally true when the sub-pixel configuration for rows and columns is exchanged.

Figure 14:
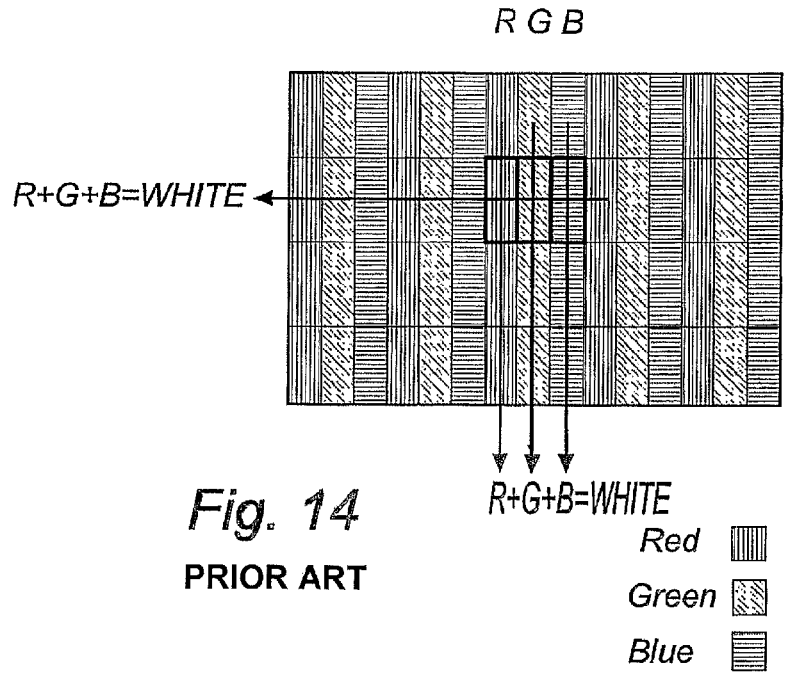
FIG. 14 is a schematic illustration of the smallest possible white display element in a prior art RGB display.

FIG. 14 is a schematic illustration of the smallest possible white display element in a prior art RGB display. In the display of FIG. 14, 4 rows comprising 5 pixels each, making a total of 20 pixels, are illustrated. Every pixel has red, green and blue sub-pixels, resulting in a total of 60 illustrated sub-pixels.

Figure 15:
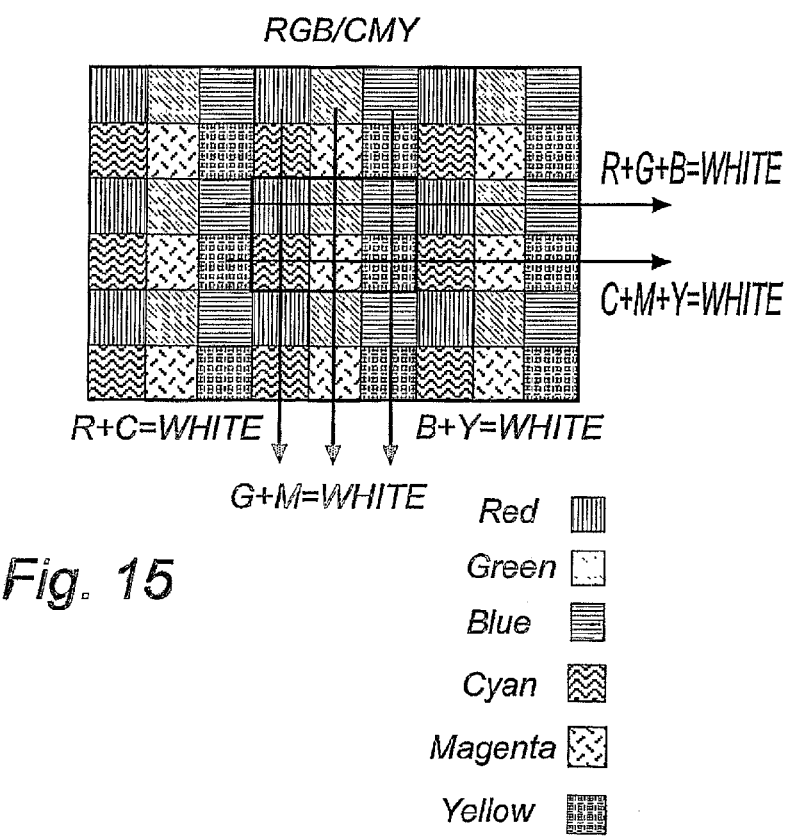
FIG. 15 is a schematic illustration of the smallest possible white display element in a display with an RGB/CMY sub-pixel arrangement according to the first embodiment of the invention.

FIG. 15 is a schematic illustration of the smallest possible white display element in a display with an RGB/CMY sub-pixel arrangement according to an aspect of the invention. In the display of FIG. 15, 3 rows comprising 3 pixels each, making a total of 9 pixels, are illustrated. Every pixel has red, green, blue, cyan, magenta and yellow sub-pixels, arranged as in the display of FIG. 11, resulting in a total of 54 illustrated sub-pixels.

In the conventional RGB display of FIG. 14, white light can be produced by activating a pixel comprising red, green and blue sub-pixels, requiring a total of three sub-pixels in the horizontal direction to be activated in order to produce white light as indicated by the arrow. Using sub-pixel algorithms, white light can be produced by the display of FIG. 15 by either activating the red sub-pixel and the cyan sub-pixel, the green sub-pixel and the magenta sub-pixel, or the blue sub-pixel and the yellow sub-pixel, as indicated by the arrows. White light can also be produced by activating the red, the green and the blue sub-pixels of a pixel or by activating the cyan, the yellow and the magenta sub-pixels of a pixel.

Although there are three times as many pixels in the RGB display of FIG. 14 as in the RGB/CMY display of FIG. 15, the RGB/CMY display of FIG. 15 can enable more than 1.5 times the resolution of the RGB display for black and white images (such as text).

With a view to providing an even better image quality, the arrangement of display elements which are to be arranged next to each other could comprise arranging the display elements with the highest luminance signals at the greatest distance from each other. The principle will be elucidated in the following, with reference to an exemplary RGBY display. This particular display type should however not in any way be considered as a limitation on the invention.

The exemplary RGBY display is a regular matrix arrangement comprising rows and columns of identical pixels, each pixel comprising 2×2 sub-pixels (i.e. each pixel comprises four different sub-pixels, one of every color, arranged in 2 rows with 2 sub-pixels in every row).

In any RGBY matrix display, the pair of green display elements and yellow display elements typically represent a higher luminance than any other pair of display elements such as red display elements and blue display elements.

By arranging the green display elements and the yellow display elements on the diagonals of the pixels, instead of on the same row (or column), the spatial distance between the particular pair of display elements which represent the highest luminance is maximized.

This can for instance be achieved by arranging the red display elements and the yellow display elements on a first row, and the green display elements and the blue display elements on a second row, instead of arranging the red display elements and the blue display elements on a first row and the green display elements and the yellow display elements on a second row. In this way, the distance between the centres of the yellow and green display elements would be equal to or larger than any other spatial distance between any other pair of display elements, namely approximately $\sqrt{2}=1.41$ times the distance between the green display elements and the blue display elements for instance.

Hence a new and innovative display which presents the best homogeneity in color and luminance and limits the color and luminance errors and maximizes the resolution for images comprising black and white text has been proposed.

The illustrated arrangements of the pixels in the displays should not be considered to constitute a limitation, since pixels and sub-pixels may be of various regular or irregular shapes and arranged in a variety of regular or irregular patterns.

The display according to the present invention may, for example, be realized as a separate, stand-alone unit, or may alternatively be included in, or combined with, a mobile terminal for a telecommunications network, such as GSM, UMTS, GPS, GPRS or D-AMPS, or another portable device of an existing type, such as a Personal Digital Assistant (PDA), palmtop computer, portable computer, electronic calendar, electronic book, television set or video game control, as well as various other office automation equipment and audio/video machinery, etc.

The invention has mainly been described with reference to main embodiments. However, embodiments other than the ones disclosed above are equally possible within the scope of the invention, as defined by the appended patent claims. All terms used in the claims are to be interpreted according to their ordinary meaning in the technical field, unless explicitly defined otherwise herein. All references to "a/an/the [element, means, component, member, unit, step etc.]" are to be interpreted openly as referring to at least one instance of said element, means, component, member, unit, step etc. The steps of the methods described herein do not have to be performed in the exact order disclosed, unless explicitly specified.

The invention claimed is:

1. A display comprising a plurality of first, second, third, fourth, and fifth sub-pixel display elements, which are arranged in rows and controllable by row and column drivers to display first, second, third, and fourth, and fifth different colors, respectively, a first pixel of a displayed image being reproducible by sequential sub-pixel display elements in a single row of the display and a second pixel of a displayed image being reproducible by sequential sub-pixel display elements in a second single row of the display, said first and second rows being adjacent and co-planar, wherein for each sub-pixel display element associated with the first pixel, there is a minimal spatial distance between the sub-pixel display element and a respective element associated with the second pixel that represents a color having a maximum color distance with respect to the color represented by such sub-pixel display element compared to the color distance between the color represented by the sub-pixel display element and other colors.

2. A display according to claim 1, further comprising sixth sub-pixel display elements, which are controllable to display a sixth different color.

3. A display according to claim 1, wherein the display is a matrix display.

4. A display according to claim 1, wherein the different colors comprise red, blue, green, yellow and magenta.

5. The display of claim 4, further comprising sixth sub-pixel display elements, which are controllable to display a sixth different color, wherein said sixth color is cyan.

6. The display of claim 1, wherein a first sub-pixel display element representing a first color and a second sub-pixel display element representing a second color, said colors representing the greatest luminance, said first and second sub-pixel display elements being associated respectively with said first and second pixels are both arranged with respect to a third sub-pixel display element representing a third color such that the spatial distance of the first and second sub-pixel display elements is larger than the spatial distance of either said first or second sub-pixel display element to the third element.

* * * * *